United States Patent
Harata et al.

(10) Patent No.: US 6,878,649 B2
(45) Date of Patent: Apr. 12, 2005

(54) LOW-EMISSION SKIN MATERIAL

(75) Inventors: Hiroaki Harata, Yokohama (JP); Hiroki Nagayama, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 211 days.

(21) Appl. No.: 10/253,539

(22) Filed: Sep. 25, 2002

(65) Prior Publication Data

US 2003/0082975 A1 May 1, 2003

(30) Foreign Application Priority Data

Oct. 26, 2001 (JP) .................................... 2001-329136

(51) Int. Cl.$^7$ ............................................. B32B 15/14
(52) U.S. Cl. .................. 442/228; 442/230; 442/231; 442/232; 442/236; 442/376; 442/378; 442/379; 156/166
(58) Field of Search ............................. 442/228, 230, 442/231, 232, 236, 376, 378, 379; 156/166

(56) References Cited

U.S. PATENT DOCUMENTS 4,205,110 A * 5/1980 Jean .......................... 428/213
5,916,828 A * 6/1999 Messner ..................... 442/132

FOREIGN PATENT DOCUMENTS

| DE | 2923251 A | * 12/1980 | ............. E04B/1/76 |
| JP | 5-193668 | 8/1993 | |
| JP | 9-295509 | 11/1997 | |
| JP | 2001-158306 | 6/2001 | |

OTHER PUBLICATIONS

"Standard Test Method for Determination of Emittance of Materials Near Room Temperature Using Portable Emissiometers", *American Society for Testing and Materials*, C1371–98, pp. 1–8.

* cited by examiner

Primary Examiner—Elizabeth M. Cole
(74) Attorney, Agent, or Firm—Foley & Lardner LLP

(57) ABSTRACT

A low-emission skin material of the present invention comprises a decorative layer made of a fibrous substance comprising 60% by weight or more of bright fiber based on the total weight of the fibrous substance; a reflective layer laminated to the decorative layer and capable of reflecting visible radiation, near-infrared radiation, mid-infrared radiation and far-infrared radiation; and a support layer laminated to the reflective layer to support the reflective layer.

19 Claims, 1 Drawing Sheet

LOW-EMISSION SKIN MATERIAL

BACKGROUND OF THE INVENTION

The present invention relates to a material designed to provide a pleasant thermal environment by relieving summer heat, and more specifically to a low-emission skin material for a vehicle interior trim component, which can prevent not only a temperature rise in the interior trim component but also heat radiation therefrom to the interior and occupant of a vehicle even when the vehicle is parked in the hot sun.

The interior of a parked vehicle reaches a high temperature in the hot sun. It is reported that the temperature of the vehicle interior is elevated to about 70° C. with interior trim components e.g. an instrument panel and a ceiling thereof heated to about 100° C. and to about 70° C., respectively, while the vehicle is parked under the scorching sun in Japanese summer. Needless to say, it is unpleasant to ride in such a vehicle. In addition, the heated interior trim components emit radiant heat therefrom over an extended time period so that the vehicle interior and the interior trim components cannot be easily cooled by ventilation and air conditioning. The air conditioning thus results in excessive energy consumption.

In order to address the above problems, Japanese Laid-Open Patent Publication No. 9-295509 proposes a system for ventilating a vehicle interior by the use of a solar battery. However, the proposed ventilation system only allows one part of the vehicle interior to be ventilated, and does not provide practical solutions to the problem of radiant heat being emitted from the interior trim components.

For the purpose of preventing temperature rises in vehicle interior trim components, Japanese Laid-Open Patent Publication No. 2001-158306 proposes a heat shield system that comprises a heat-wave reflection layer provided between a roof panel and a roof lining so as to reflect sunlight and thereby keep heat from coming into a vehicle interior through the roof panel. The proposed heat shield system prevents a temperature rise in a vehicle ceiling to some degree, but cannot eliminate the heat transfer paths over which sunlight gets into the vehicle interior through window glasses and is then reflected by and absorbed in interior trim components such as an instrument panel to cause heat radiation therefrom. Accordingly, the temperature rise preventing effect of the heat shield system is very limited.

Japanese Laid-Open Patent Publication No. 5-193668 proposes a laminate film for e.g. a refrigerator rather than automotive applications. Although the proposed laminate film attains an improved heat insulating property and a low thermal emissivity, the laminate film cannot be suitably used for a vehicle interior trim component for lack of decorativeness.

It is desired that the vehicle interior trim components are prevented from rising in temperature and, if unavoidably rise in temperature, emitting radiant heat therefrom to the vehicle interior and occupant, and are capable of providing a decorative effect for the vehicle interior. For example, the vehicle interior trim components are generally colored in gray. In the case of the interior trim component being made of a fibrous substance, the interior trim component can be colored by e.g. kneading a white inorganic pigment (such as titanium oxide) into fiber or dyeing the fibrous substance. Opaque dull fiber in which white inorganic pigment (such as titanium oxide) is kneaded may be mixed or blended in order to adjust the color tone of the interior trim component and prevent the occurrence of see-through sections in the interior trim component. However, the interior trim component colored with an inorganic pigment absorbs not only visible radiation but also infrared radiation that is originally irrelevant to decorativeness, and then, converts the absorbed visible and infrared radiation into heat. It is thus difficult to prevent a temperature rise in the interior trim component and heat radiation therefrom.

SUMMARY OF THE INVENTION

It is therefore an object of the present invention to provide a low-emission skin material for a vehicle interior trim component, capable of:

(1) preventing a temperature rise in the interior trim component due visible and infrared radiation;

(2) even when the interior trim component unavoidably rises in temperature due to visible and infrared radiation, preventing radiant heat from being emitted from the interior trim component to vehicle interior and occupant; and (3) providing a decorative effect for the vehicle interior.

According to an aspect of the present invention, there is provided a low-emission skin material comprising: a decorative layer made of a fibrous substance comprising 60% by weight or more of bright fiber based on a total weight of the fibrous substance; a reflective layer laminated to the decorative layer and capable of reflecting visible radiation, near-infrared radiation, mid-infrared radiation and far-infrared radiation; and a support layer laminated to the reflective layer to support the reflective layer.

DESCRIPTION OF THE INVENTION

Figure 1:
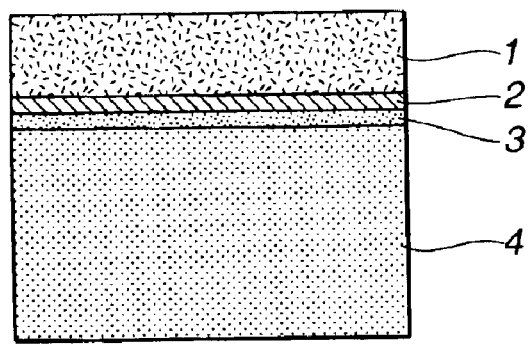
FIG. 1 is a sectional view of an interior trim component that comprises a low-emission skin material according to the present invention.

According to the present invention, a low-emission skin material comprises: decorative layer 1; reflective layer 2 laminated to decorative layer 1; and support layer 3 laminated to reflective layer 2, as shown in FIG. 1. The low-emission skin material of the present invention allows visible, near-infrared, mid-infrared and far-infrared radiation, such as sunlight entering through vehicle windows and radiant heat emitted from various auto parts (including an instrument panel and vehicle windows) heated by direct sunlight, to pass through decorative layer 1 and be reflected off reflective layer 2. In the application of such a low-emission skin material to a vehicle interior component, it is possible to prevent a temperature rise in the interior trim component and heat radiation therefrom to the interior and occupant of a vehicle.

Decorative layer 1 is made of a fibrous substance comprising 60% by weight or more of bright fiber based on the total weight of the fibrous substance.

The "bright fiber" generally refers to fiber that is perceived as bright by human eyes without the scattering of light being caused by a filler and a colorant, and incidentally has a transparency to light. In the earlier technology, the bright fiber has been used in e.g. an underroof sound absorbing material and a wadding without the need for decorativeness, and rarely used alone in the skin material of an interior trim component. In the present invention, however, the bright fiber is used in decorative layer 1 so as to allow visible, near-infrared, mid-infrared and far-infrared radiation to pass therethrough owing to its optical property (i.e., transparency). This makes it possible to prevent a temperature rise in the interior trim component and heat radiation therefrom that can be caused by the absorption of visible and infrared radiation. Further, the bright fiber contributes decorativeness to decorative layer 1 of the skin material. Herein, the term "bright fiber" is defined as transparent and colorless fiber containing no filler and colorant, or fiber containing any known additives including a filler and a colorant in such amounts as to allow light transmission in the present invention. The amount of each additive should be determined as appropriate depending on the kind of the additive used, and is usually 1.0% by weight or less based on the weight of the bright fiber so that there is little loss of transparency of the bright fiber.

The bright fiber is contained in the fibrous substance in an amount of 60% by weight or more based on the total weight of the fibrous substance so that decorative layer 1 attains a sufficiently high transparency to visible and infrared radiation. In order to attain a higher transparency of decorative layer 1, the bright fiber is preferably contained in an amount of 75% by weight or more based on the total weight of the fibrous material. In the fibrous substance, the bright fiber may be used alone or in combination with a different kind of fiber.

The fibrous substance used in decorative layer 1 is preferably a woven fabric or a nonwoven fabric.

The woven fabric used is not particularly limited, and can be of any known type. Examples of the woven fabrics include tricot fabric, raschel fabric, plain fabric, pile fabric and moquette fabric. Among these woven fabrics, preferred is tricot fabric having a low fiber density and capable of being stretched in view of transparency and workability. Basic weaves for the woven fabrics include plain weave in which each warp fiber (or yarn) passes alternately over and under each fill fiber (or yarn), twill weave in which warp and fill are interlaced in groups of two or more fibers (or yarns) to form diagonal lines on the fabric's face, and satin weave in which warp or fill has long floats in one direction on the fabric's face. Various applications are possible, which include combinations of the above basic weaves. Further, there may be also used double weave in which warp and fill are made double, pile weave in which warp and/or fill are made projected from the fabric's face as cut ends (fuzz) or loops, and leno weave. The above-mentioned tricot fabric can be formed by double weave with its warp alternately binding to resist raveling. The weaving method is not limited to the above, and should be selected according to the characteristics of the fiber used and the fabric density appropriate thereto.

The nonwoven fabric used is not particularly limited, and can be of any known type. Examples of the nonwoven fabrics include wet nonwoven fabrics formed in the same manner as in papermaking where fiber is bonded by self-adhesion, an adhesive or adhesive fiber, or is intertwined by means of high-pressure water stream, and dry nonwoven fabrics in which fiber is formed into a web by e.g. carding, and then, bonding by self-adhesion, an adhesive or adhesive fiber. In the dry nonwoven fabric, the formed webs may be combined by needle punching or interweaved with thread. Further, there may be used spunbonded nonwoven fabrics in which fiber is formed into a web simultaneously with spinning by e.g. self-adhesion, meltblown nonwoven fabrics in which a melt of polymer is extruded and blown with hot air to form a web of fine-spun fiber, flashspun nonwoven fabrics in which polymer is dissolved in a solvent and spun at high pressure, and tow-open nonwoven fabrics in which large bundles of fiber (called tow) are opened, laminated, extended and then bonded. These nonwoven fabrics may be used alone in one or more layers, or in any combination thereof. The method of forming the nonwoven fabric is not limited to the above, and should be selected depending on the characteristics of fiber used and the fabric density appropriate thereto. The nonwoven fabric can be preferably used in the present invention, for the reason that the nonwoven fabric can be formed of any kind of fiber, attain a variety of performance and have higher productivity than the woven fabric.

The fibrous substance used in the present invention preferably has a density ranging from 5 to 500 $g/m^2$, more preferably from 20 to 200 $g/m^2$, so that decorative layer 1 attains not only a transparency to light but also decorativeness. When the density of the fibrous substance is less than 5 $g/m^2$, there arises the possibility of see-through sections being produced in decorative layer 1 to cause a deterioration in decorativeness. On the other hand, when the density of the fibrous substance exceeds 500 $g/m^2$, decorative layer 1 becomes so thick that there arises the difficulty of allowing light to pass through decorative layer 1. It should be noted that the density of the fibrous substance might be out of the above-specified range in some substance forms. For example, there may be used some types of rough-woven fabric, such as net, having a density exceeding the above-specified range in the present invention.

The bright fiber used in the present invention is not particularly restricted, and can be any fiber that has a transparency to visible and infrared radiation. Preferably, the bright fiber is made of at least one polymeric compound selected from the group consisting of polyesters, polyolefins, polyacrylonitriles, polyamides and copolymers thereof so that the bright fiber has good transparency, workability, mechanical strength, availability and capability of being mixed or blended with a different kind of fiber.

The polyester used is a polymeric compound having an ester group (—CO—O—) in the molecule. Specific examples of such polymeric compounds include: polyethylene terephthalate (PET); polybutylene telephthalate (PBT); polyethylene naphthalate (PEN); polybutylene naphthalate (PBN); polyethylene isophtalate (PEI); polybutylene isophtalate (PBI); poly-E-caprolactone (PCL); PBT derivatives in which an ethylene glycol component is substituted with another glycol component, such as polyhexamethylene terephthalate (PHT); and PET derivatives in which a terephthalic acid component is substituted with another dibasic acid component, such as polyhexamethylene isophtalate (PHI) or polyhexamethylene naphthalate (PHN). Among these polymeric compounds, preferred is PET. Further, the polyester may be blockcopolymers of which block is formed of the above polyester compound, such as a copolymer of PBT and polytetramethylene glycol (PTMG), a copolymer of PET and PEI, a copolymer of PBT and PBI and a copolymer of PBT and PCL.

The polyolefin used is a polymeric compound prepared by the polymerization of olefin (i.e. hydrocarbon having one double bond per molecule). Specific examples of such polymeric compounds include polyethylene, polypropylene, polybutylene, polyisobutylene and polypentene, which are preferably used in the present invention. Among these polymeric compounds, especially preferred is polypropylene. Further, the polyolefin may be a copolymer of olefin compounds, such as ethylene-propylene copolymer, ethylene-butylene copolymer and propylene-butylene copolymer.

The polyacrylonitrile used is a polymeric compound prepared by the emulsion polymerization of acrylonitrile, more specifically prepared by the copolymerization of acrylonitrile with vinyl chloride, vinyl acetate, acrylic ester or methacrylic ester. Specific examples of such polymeric compounds include acrylonitrile-methyl acrylate copolymer, acrylonitrile-methyl methacrylate copolymer and acrylonitrile-vinyl acetate copolymer. These polyacrylonitrile compounds can be preferably used in the present invention.

The polyamide used is a polymeric compound having an amide group (—CONH—) in its main chain. As polyamide fiber, there may be exemplified by nylon 6,6 prepared by the condensation polymerization of adipic acid and hexamethylene diamine, nylon 6 prepared by the ring-opening polymerization of caprolactam and other polyamide nylons such as nylon 11, nylon 6,11 and nylon 6,12 available from DuPont Company, and aramid fibers such as Nomex (a trademark for poly-meta-phenylene isophtalamide) and Kevlar (a trademark for poly-para-phenylene terephthalamide) avairable from DuPont Company. These polyamide fibers are preferably used in the present invention.

Among the above-specified polymeric compounds for the bright fiber, especially preferred are polyacrylonitrile and polyolefin in view of transparency.

The bright fiber may be conjugate fiber formed by spinning at least two different polymeric compounds through a spinneret. Various kinds of conjugate fiber are usable, which include core-sheath type, side-by-side type and the like. For example, side-by-side type PET conjugate fiber having one side thereof being made of PET and the other side being made of a polyester copolymer can be preferably used.

Further, the bright fiber may be mixed or blended with a different kind of fiber so that decorative layer 1 not only attains transparency to light and decorativeness required of the present invention but also achieves a variety of performance such as weather resistance and heat resistance to be suitable for automotive applications.

The fiber mixed or blended with the bright fiber is not particularly limited, and can be selected depending on what performance is required in the application of the material. For example, there may be used: natural fiber, such as cotton and wool; regenerated fiber, such as rayon and acetate; and semisynthetic fiber. These kinds of fiber may have a low transparency to visible and infrared radiation, but have good decorativeness and/or performance. It is thus possible for decorative layer 1 to attain a high light transparency as well as good decorativeness and/or performance by the combination of the bright fiber and the above fiber. Further, various types of conjugate fiber (including core-sheath type and side-by-side type), continuous fiber and discontinuous fiber can be used in combination with the bright fiber. The cross-sectional profile of the fiber mixed or blended with the bright fiber can be in various shapes, such as circle and non-circle (such as Y-shape, triangular shape, quadrangular shape and star shape). The amount of the fiber mixed or blended can be varied depending on the kind and/or shape thereof, and is usually about 30% by weight based on the total weight of the fibrous substance so that decorative layer 1 get performance from the mixed or blended fiber with little loss of transparency.

It is noted that, if the fiber mixed or blended with the bright fiber has any factor that may influence the transparency of decorative layer 1, the amount of the fiber mixed or blended needs to be determined with discretion. For example, the fiber in a non-circular shape is more likely to enhance light reflection than the fiber in a circular shape. In such a case, it becomes necessary to control the amount of the fiber mixed or blended by e.g. adjusting the fiber density of the fibrous substance.

The fiber used in the fibrous substance preferably has a size (i.e. diameter) of 0.1 to 15 denier, preferably 0.5 to 5 denier, so that decorative layer 1 not only attains decorativeness but also inhibits scatter reflections that contribute to a deterioration in light transparency. When the fiber size is less than 0.1 denier, the fibrous substance has a large specific surface per unit so that scatter reflections occur at an interface between the fiber surface and the air and cause a deterioration in transparency. On the other hand, when the fiber size exceeds 15 denier, there arises the possibility of see-through sections being produced in decorative layer 1 because of a little fiber quantity even when the fibrous substance is formed at a desirable density. In order to avoid the occurrence of see-through sections in decorative layer 1, the density of the fibrous substance may be increased. In such a case, however, the fibrous substance becomes so thick that decorative layer 1 tends to have a large absorption of far-infrared radiation.

In the present invention, the fibrous substance may be colored with a colorant such as an organic pigment and/or dye, as mentioned above, so that decorative layer 1 has good decorativeness. The method for coloring the fibrous substance is not particularly restricted. For example, the fibrous substance can be produced from the bright fiber colored by solution dyeing (i.e. adding an organic pigment or dye to a resinous raw material for the bright fiber in the stage of spinning), or produced from the bright fiber dyed with organic dye. These coloring methods can be preferably used in the present invention. Alternatively, the fibrous substance may be colored by dyeing or printing, after formed into a woven or nonwoven fabric. The dyeing and printing methods are not particularly restricted, and can be any known methods.

The organic pigment is generally used in the solution dyeing method, and can be of any known kind. Specific examples of the organic pigments includes: red pigments, such as azo pigments, quinacridone pigments and anthraquinone pigments; orange pigments, such as diketopyrrolopyrrole pigments; yellow pigments, such as azo pigments and isoindolinone pigments; blue or green pigments, such as cyanine pigments and phthalocyanine pigments; and violet pigments, such as dioxazine pigments.

The organic dye is generally used to dye the bright fiber or the fibrous substance, and can be of any known kind. Specific examples of the organic dyes include azo dyes, anthraquinone dyes, indigoid dyes, phthalocyanine dyes, carbonium ion dyes and quinone dyes.

The above-specified organic pigments and dyes may be used alone or in combination thereof so as to color the fibrous substance in a desired coloration. These organic pigments and dyes have large absorptions of some wavelengths only in the visible regions for their distinctive colors, and do not absorb unwanted light radiation. Accordingly, the fibrous substance colored with such an organic pigment and/or dye can provide an effect that compares favorably with that of the fibrous substance with no organic pigment and dye. Although the above organic pigments and dyes can be suitably used in the present invention, especially preferred is an organic pigment or dye with no absorption band in the visible, near-infrared, mid-infrared and far-infrared regions so that the fibrous substance colored with such an organic pigment or dye provides an effect that compared more favorably with that of the fibrous substance with no pigment and dye.

The amount of the organic pigment or dye used is not particularly restricted, and can be determined depending on the kind of the organic pigment or dye used. The amount of the organic pigment or dye used is usually in an amount of 1.0% by weight or less based on the weight of the bright fiber, but some organic pigments and dyes may be used in a larger amount.

Various inorganic pigments, such as carbon black or metal oxide, may be also used a colorant. The inorganic pigment is not particularly limited, and can be any known one. However, if the inorganic pigment is added in a large amount, there arises the possibility of light transparency being deteriorated by reflecting and absorbing visible and infrared radiation, as described above. Thus, the inorganic pigment needs to be used in such an amount as to allow light transmission. The amount of the inorganic pigment used should be determined depending on the kind thereof, and is usually 1.0% by weight or less based on the weight of the bright fiber.

Reflective layer 2 is capable of reflecting visible, near-infrared, mid-infrared and far-infrared radiation to prevent a temperature rise in interior trim component and heat radiation therefrom that can be caused by the absorption of visible and infrared radiation. In order to achieve such a capability, reflective layer 2 is preferably made of metal with a reflection surface thereof having a shine. More specifically, reflective layer 2 is preferably made of a metallic film, a metallic foil or metallic flakes. The metal and thickness of reflective layer 2 can be suitably selected depending on the application area for the material in the vehicle interior.

The metallic film used in the present invention is formed by e.g. vapor deposition or sputtering, preferably vapor deposition. The metal for the metallic film is not particularly restricted. As the metal for the metallic film, there can be used: industrially generalized colorless metals, such as aluminum, silver, nickel, iron and stainless steel; and colored metals, such as gold and copper. These metals may be used alone or in combination with different kinds of metals to form an alloy, such as aluminum alloy. Among these metals, preferred are aluminum, aluminum alloy, nickel, stainless steel and in view of reflectivity, cost performance and availability. Aluminum and aluminum alloy are especially preferred.

The metallic foil is formed by e.g. mechanically beating of a ductile metal. The metal for the metallic foil is not particularly restricted as long as it is ductile. As the metal for the metallic foil, there may be exemplified by gold, silver, aluminum and tin. Among these metals, preferred is aluminum in view of workability and cost performance.

The metallic flakes are formed by e.g. cutting a metallic film or a metal-evaporated resin film. The form of metallic flakes is not particularly restricted as long as the flakes can be arranged so as to form a smooth reflection surface and thereby attain a sufficient reflectivity to visible and infrared radiation. For example, the metallic flakes may be formed into scales, powder or particles. Preferably, the metallic flakes are formed into scales in view of light reflectivity. The metal for the metallic flakes is not particularly limited. As the metal for the metallic flakes, there may be used: industrially generalized colorless metals, such as aluminum, silver, nickel, iron and stainless steel; and colored metals, such as gold or copper. These metals may be used alone or in combination with different kinds of metals to form an alloy, such as aluminum alloy. In the present invention, aluminum, aluminum alloy, nickel and stainless steel are preferably used in view of light reflectivity, cost performance and availability. Aluminum and aluminum alloy are especially preferred because of excellent cost performance and availability thereof.

Alternately, reflective layer 2 may be formed of a metal oxide white pigment such as $TiO_2$ having a high reflectivity to sunlight, or a thin film made of a semiconducting oxide such as indium-tin oxide (ITO) or antimony-tin oxide (ATO) having a high reflectivity to far-infrared radiation.

Support layer 3 is provided to keep reflective layer 2 smooth and thereby avoid a deterioration in the reflectivity of reflective layer 2 owing to scatter reflections. The form of support layer 3 is not particularly limited, as long as it can keep reflective layer 2 smooth. Preferably, support layer 3 is made of a resin film, a woven fabric or a nonwoven fabric. Examples of the resin films include polyester films, polyethylene films, polypropylene films, polyvinyl chloride films, polyvinylidene chloride films, polyvinyl alcohol films, polyamide films and polymethyl methacrylate films. Both of the woven and nonwoven fabrics are not particularly limited and can be exemplified by the same woven and nonwoven fabrics as usable in the fibrous substance of decorative layer 1.

The form of support layer 3 is determined depending on the application area of the material in the vehicle interior. For example, support layer 3 is preferably made of a resin film when the skin material requires some smoothness. Especially when the skin material is applied to a vehicle ceiling, support layer 3 is preferably made of a polyester film in view of workability. A nonwoven fabric may be also suitable for support layer 3 when the skin material is applied to a vehicle ceiling, for the reason that the nonwoven fabric is made as smooth as the resin film through a hot pressing process. On the other hand, when the skin material requires formability/workability, support layer 3 is preferably made of a flexible woven or nonwoven fabric so that the material can be formed into a desired shape. Further, the form of support layer 3 is selected in consideration of compatibility and adhesiveness with reflective layer 2. If a combination of reflective layer 2 and support layer 3 is inappropriate for lack of adhesion between reflective layer 2 and support layer 3, there arises the possibility of defects, such as cracks, being produced during a forming process. It is thus necessary to select a combination of reflective layer 2 and support layer 3 so as to attain at least adhesion between reflective layer 2 and support layer 3, but any defects can be tolerated unless the reflectivity of reflective layer 2 is deteriorated.

Reflective layer 2 and support layer 3 can be laminated to each other by any know methods. For example, in the case of reflective layer 2 being made of a metallic film, reflective layer 2 can be laminated to support layer 3 by vapor deposition or sputtering of metal for reflective layer 2 onto support layer 3. In the case of reflective layer 2 being made of a metallic foil, reflective layer 2 can be laminated to support layer 3 by lamination processing in which reflective layer 2 and support layer 3 are roller pressed and bonded to each other with the use of an adhesive, such as an acrylic adhesive. In the case of reflective layer 2 being made of metallic chips, reflective layer 2 can be laminated to support layer 3 by dispersing the metallic flakes for reflective layer 2 and a hardener in a resin, diluting the thus-obtained dispersion with a solvent and applying the diluted dispersion to support layer 3 by the use of a doctor blade or by spraying. The above resin, hardener and solvent are not particularly limited, and can be of any known types. Example of the resin includes oil-free polyester resin compounds. Example of the hardener includes polyisocyanate compounds. Examples of the solvent include xylene, toluene, acetone and ethanol.

In the present invention, the degree of heat radiation preventing effect can be assessed in terms of far-infrared emissivity. Herein, the "far-infrared emissivity" is measured according to ASTM C1371-98. More specifically, a sample was supplied with a predetermined amount of heat, and then, reflected heat and radiant heat from the sample were measured using a differential thermocouple. The emissivity is defined as a ratio of the heat emitted by the sample surface at a given temperature to that of a perfect emitter (a black body with emissivity of 1.0) at the same temperature. The differential thermocouple used is not particularly limited, and can be any far-infrared radiometer based on the ASTM standard.

The heat radiation preventing effect of the skin material is derived from reflective layer 2. The far-infrared emissivity of the skin material is larger than that of reflective layer 2 by itself, because of being measured through decorative layer 1. However, with reflective layer 2 formed as described above, it is possible for the skin material to attain a relatively low far-infrared emissivity and therefore possible to prevent radiant heat from being emitted from the interior trim component effectively. Preferably, reflective layer 2 by itself has a far-infrared emissivity of 0.5 or lower. When the far-infrared emissivity of reflective layer 2 exceeds 0.5, the heat radiation preventing effect is decreased so that the vehicle occupant tends to feel uncomfortable.

According to the circumstances of manufacturing, there may be a case where a coating is formed in the surface of reflective layer 2. It is desirable that such a coating is as thin as possible, and more specifically, the coating is less than 50 $\mu$m in thickness. When the thickness of the coating is equal to and larger than 50 $\mu$m, the coating dominates the properties of reflective layer 2 so that the reflectivity of reflective layer 2 is deteriorated. Herein, the "coating" refers to an organic coating formed by the adhesion of the metallic flakes of reflective layer 2 to support layer 3 with the use of an organic adhesive or an oxide coating resulting from oxidation of reflective layer 2. The oxide coating is particularly undesirable, because the oxide coating has a high far-infrared emissivity and thus causes an increase in the far-infrared emissivity of reflective layer 2. It is thus preferred that reflective layer 2 is made of a metal having good oxidation resistance, such as noble metal or nickel, or aluminum by vapor deposition with high metal purity in order to avoid the formation of oxide coating. The degree of heat radiation preventing effect is also affected by the smoothness of reflective layer 2. In other words, the far-infrared emissivity of reflective layer 2 tends to become high when the smoothness of reflective layer 2 is deteriorated. Accordingly, reflective layer 2 is desired to be as smooth as possible.

As a preferable combination of reflective layer 2 and support layer 3, there can be used an aluminum-evaporated resin film in which an aluminum or aluminum alloy layer (i.e., reflective layer 2) is formed on a resin film layer (i.e., support layer 3) by vapor deposition. Such a combination of reflective layer 2 and support layer 3 is preferred in terms of high reflectivity to sunlight and radiant heat from other auto parts, capability of preventing radiant heat from being emitted from the interior trim component itself, smoothness, oxidation resistance, industrial manufacturability, cost performance, good adhesion between the aluminum or aluminum alloy layer and the resin film layer and flexibility. The aluminum-evaporated resin film can be commercially available. One example of the commercially available aluminum-evaporated resin film is EMBLET M-25 available from Unitika Ltd., which is formed by vapor deposition of aluminum onto one side of a polyester film having a thickness of 25 $\mu$m so as to attain a far-infrared emissivity of 0.05 at the aluminum evaporated side.

The skin material of the present invention can be processed into a vehicle interior trim component. With the interior trim component comprised of the above-described low-emission skin material, it is possible to prevent the interior trim component from rising in temperature and emitting radiant heat therefrom even while the vehicle is parked or driven in the hot sun.

As shown in FIG. 1, the interior trim component may further comprise substrate 4 provided to support layer 3 of the skin material such that the interior trim component is reinforced with substrate 4. Substrate 4 can be formed of any material suitable for automotive applications, and is selected depending on the application area of the component in the vehicle interior in consideration of workability and strength thereof. For example, there may be used for substrate 4 woven fabrics, nonwoven fabrics, resin films, corrugated cardboards and resin felts. In the case of applying the interior trim component to a vehicle ceiling, substrate 4 is preferably made of a nonwoven fabric, a corrugated cardboard or a resin felt. Steel wires may be used for a suspended ceiling.

The low-emission skin material and the interior trim component comprising the low-emission skin material can be basically applied to any part of the vehicle interior. Particularly, the skin material and the interior trim component are fit for use in a vehicle ceiling that is most susceptible to heat through a roof and is located near the occupant's head, thereby effectively increasing the comfort of the occupant in the vehicle interior. Further, the skin material and the interior trim component can be suitably used for a seat, because the seat is held into contact with the vehicle occupant for many hours and requires decorativeness. The skin material and the interior trim component can be also suitably used for a door trim board and a rear parcel shelf where decorativeness is required.

The skin material and the interior trim component according to the present invention can be produced by the following procedure.

Fiber for decorative layer 1 is first formed by spinning. The spinning method is not particularly limited, and can be any known methods, such as melt spinning in which a viscous melt of polymer is extruded into the air, gas or a liquid and solidified, dry spinning in which fiber is formed by discharging a solution of polymer into heated air and removing a solvent from the solution, or wet spinning in which fiber is formed by extruding a solvent of polymer into a liquid.

Then, the thus-formed fiber is processed into a fibrous substance for decorative layer 1. As described above, the fibrous substance is preferably a woven or nonwoven fabric, and can be formed by any known method.

Support layer 3 is prepared, and reflective layer 2 is laminated to support layer 3 by the above-described method.

Then, decorative layer 1 is laminated to reflective layer 2 by e.g. flame lamination in which the fibrous substance is flame treated and then immediately roller pressed to reflective layer 2.

The skin material may be subjected to a forming process according to the application thereof. Further, the skin material may be processed into an interior trim component by e.g. providing substrate 4 to support layer 3 of the skin material and pressure forming.

The present invention will be described in more detail by reference to the following examples. However, it should be noted that the following examples are only illustrative and not intended to limit the invention thereto.

In the examples, skin materials are prepared and then processed into interior trim components. The interior trim components were herein designed for vehicle ceilings so as to make the most effective use of the skin materials.

EXAMPLE 1

A nonwoven fabric was prepared by subjecting 30% by weight of PET bright fiber (fiber size: 2 denier, fiber length: 51 mm) and 70% by weight of core-sheath type conjugate bright fiber (fiber size: 3 denier, fiber length: 51 mm, core component: PET, sheath component: PET/PEI copolymer having a boiling point of 170° C.) to card cross layering and needle punching processes, in which the nonwoven fabric had a density of 50 g/m$^2$. Then, the nonwoven fabric was adhered to the aluminum-evaporated side of an aluminum-evaporated polyester film: EMBLET MP-25 available from Unitika Ltd. by flame lamination, thereby forming a skin material. Herein, the skin material was formed with decorative layer 1 of the nonwoven fabric, reflective layer 2 of the evaporated aluminum and support layer 3 of the polyester film, and reflective layer 2 by itself (i.e. the aluminum-evaporated side of EMBLET MP-25) had a far-infrared emissivity of 0.05.

Another nonwoven fabric was prepared by subjecting 50% by weight of PET bright fiber (fiber size: 13 denier, fiber length: 51 mm) and 50% by weight of core-sheath type conjugate bright fiber (fiber size: 3 denier, fiber length: 51 mm, core component: PET, sheath component: PET/PEI copolymer with a boiling point of 170° C.) to a card cross layering process, in which the nonwoven fabric had a density of 1,000 g/m$^2$. Then, the nonwoven fabric was laminated as substrate 4 to the resin film side (i.e. support layer side) of the skin material, and the thus-obtained laminate was pressure formed into an interior trim component for a vehicle ceiling with a thickness of 20 mm by heating at 210° C. and cold pressing.

EXAMPLE 2

A nonwoven fabric was prepared by subjecting 50% by weight of PET bright fiber (fiber size: 2 denier, fiber length: 51 mm), 20% by weight of PET dull fiber (fiber size: 2 denier, fiber length: 51 mm) containing 3% by weight of titanium oxide particles based on the weight of a raw material of the dull fiber, and 30% by weight of core-sheath type conjugate bright fiber (fiber size: 3 denier, fiber length: 51 mm, core component: PET, sheath component: PET/PEI copolymer having a boiling point of 170° C.) to card cross layering and needle punching processes, in which the nonwoven fabric had a density of 50 g/m$^2$.

The same procedure as in EXAMPLE 1 was repeated to form a skin material and an interior trim component, except that the above nonwoven fabric was used for decorative layer 1 of the skin material.

EXAMPLE 3

A nonwoven fabric was prepared by subjecting 70% by weight of PET bright fiber (fiber size: 2 denier, fiber length: 51 mm) and 30% by weight of core-sheath type conjugate bright fiber (fiber size: 3 denier, fiber length: 51 mm, core component: PET, sheath component: PET/PEI copolymer having a boiling point of 170° C.) to card cross layering and needle punching processes, in which the nonwoven fabric had a density of 20 g/m$^2$.

The same procedure as in EXAMPLE 1 was repeated to form a skin material and an interior trim component, except that the above nonwoven fabric was used for decorative layer 1 of the skin material.

EXAMPLE 4

A nonwoven fabric was prepared by subjecting 70% by weight of PET bright fiber (fiber size: 15 denier, fiber length: 51 mm) and 30% by weight of core-sheath type conjugate bright fibers (fiber size: 3 denier, fiber length: 51 mm, core component: PET, sheath component: PET/PEI copolymer having a boiling point of 170° C.) to card cross layering and needle punching processes, in which the nonwoven fabric had a density of 50 g/m$^2$.

The same procedure as in EXAMPLE 1 was repeated to form a skin material and an interior trim component, except that the above nonwoven fabric was used for decorative layer 1 of the skin material.

EXAMPLE 5

A tricot fabric was produced from PET bright fiber (fiber size: 5 denier), in which the tricot fabric had a density of 50 g/m$^2$.

Then, the same procedure as in EXAMPLE 1 was repeated to form a skin material and an interior trim component, except that the above tricot fabric was used for decorative layer 1 of the skin material.

EXAMPLE 6

The same procedure as in EXAMPLE 1 was repeated to form a skin material and an interior trim component, except that the nonwoven fabric for decorative layer 1 was dyed in a beige color by immersing the fabric in a dyeing solution containing 0.1% by volume of brown disperse dye: SUMIKARON available from Sumitomo Chemical Co., Ltd., washing the fabric with water after removing an excess dyeing solution, and then, drying the fabric at 120° C. for 3 minutes.

EXAMPLE 7

A nonwoven fabric was prepared by subjecting 70% by weight of polypropylene bright fiber (fiber size: 2 denier, fiber length: 51 mm) and 30% by weight of core-sheath type conjugate bright fiber (fiber size: 3 denier, fiber length: 51 mm, core component: PET, sheath component: PET/PEI copolymer with a boiling point of 170° C.) to card cross layering and needle punching processes, in which the nonwoven fabric had a density of 50 g/m$^2$.

The same procedure as in EXAMPLE 1 was repeated to form a skin material and an interior trim component, except that the above nonwoven fabric was used for decorative layer 1 of the skin material.

EXAMPLE 8

A mixture of 10 parts by weight of aluminium pigment: leafing aluminum paste available from Toyo Aluminium K. K., 5 parts by weight of oil-free type polyester resin varnish: CORONATE L-70 (solid content: 60%) available from Dainippon Ink and Chemicals Inc. and 1 parts by weight of polyisocyanate resin varnish: BECKOSOL 60 (solid content: 70%) available from Nippon Polyurethane Industry Co., Ltd. was dispersed, and then, diluted with xylene such that the dispersion had a viscosity of 20 seconds (Fordcup #4). The thus-obtained aluminum dispersion was sprayed onto a polyester film: EMBLET S-25 (film thickness: 50 μm) available from Unitika Ltd. and dried at 80° C. for 10 minutes such that the dried aluminum dispersion was 20 μm in thickness. Herein, the dried aluminum dispersion had a far-infrared emissivity of 0.37. Then, the same nonwoven fabric as used for decorative layer 1 of the skin material of EXAMPLE 1 is laminated by flame lamination to the aluminum dispersion that had been formed on the polyester film, thereby forming a skin material with decorative layer 1 of the nonwoven fabric, reflective layer 2 of the aluminum dispersion and support layer 3 of the polyester film.

The same procedure as in EXAMPLE 1 was repeated to form an interior trim component except for using the above skin material.

Comparative Example 1

A tricot fabric was produced from PET dull fiber (fiber size: 5 denier) containing 3% by weight of titanium oxide particles based on the weight of a raw material of the dull fiber, in which the tricot fabric had a density of 130 g/m². The thus-formed tricot fabric itself was used as a skin material.

A nonwoven fabric was prepared by subjecting 50% by weight of PET bright fiber (fiber size: 13 denier, fiber length: 51 mm) and 50% by weight of core-sheath type conjugate bright fiber (fiber size: 3 denier, fiber length: 51 mm, core component: PET, sheath component: PET/PEI copolymer having a boiling point of 170° C.) to card cross layering and needle punching processes, in which the nonwoven fabric had a density of 1000 g/m². Then, the tricot fabric (i.e. skin material) and the nonwoven fabric (i.e. substrate) were laminated to each other, and the thus-obtained laminate was pressure formed into an interior trim component for a vehicle ceiling with a thickness of 20 mm by heating at 210° C. and cold pressing.

Comparative Example 2

A nonwoven fabric was prepared by subjecting 50% by weight of PET dull fiber (fiber size: 2 denier, fiber length: 51 mm) containing 3% by weight of titanium oxide particles based on the weight of a raw material of the dull fiber and 30% by weight of core-sheath type conjugate bright fiber (fiber size: 3 denier, fiber length: 51 mm, core component: PET, sheath component: PET/PEI copolymer with a boiling point of 170° C.) to card cross layering and needle punching processes, in which the nonwoven fabric had a density of 50 g/m².

The same procedure as in EXAMPLE 1 was repeated to form a skin material and an interior trim component, except that the above nonwoven fabric was used for decorative layer 1 of the skin material.

Evaluations

The skin materials and the interior trim components of EXAMPLES 1 to 8 and COMPARATIVE EXAMPLES 1 and 2 were evaluated by the following methods. The evaluation results are shown in TABLE.

(1) Heat Shield Test

Figure 2:
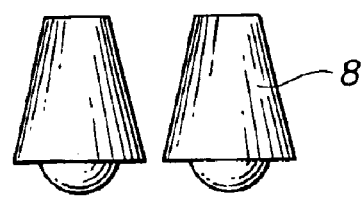
FIG. 2 is a schematic illustration of a test system for vehicle interior trim components.
Figure 2:
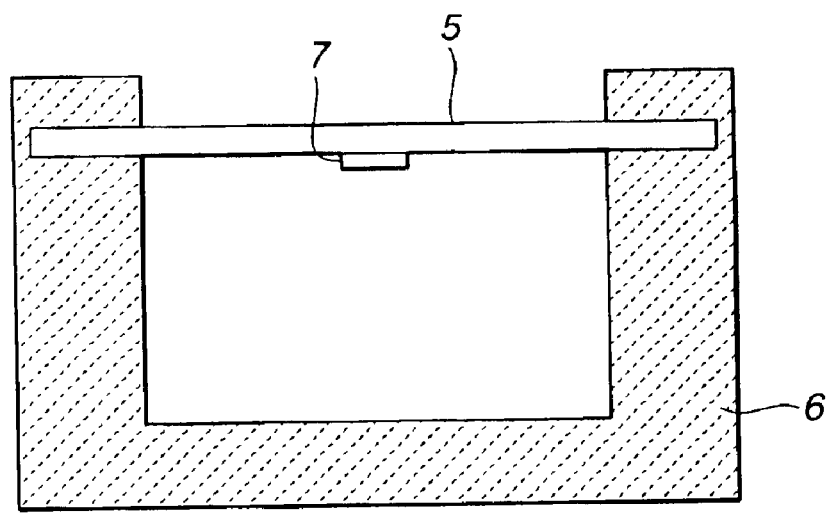

The heat shield test was conducted on the prepared interior trim components as follows by using a test system shown in FIG. 2, in order to determine the degree of resistance of the interior trim component to temperature rise.

Test sample 5 was cut from each of the interior trim components to have a size of 300 mm×300 mm. Then, test sample 5 was placed in heat-insulating wooden box 6 with thermocouple 7 (available from RS Components K.K. under the product number 219-4337) attached to a non-irradiation surface (i.e., substrate side) of test sample 5. Solar simulator 8 equipped with four 1-KW artificial solar lamps (available from Seric Ltd.) was set above test sample 5. Test sample 5 was irradiated with light from solar simulator 8 such that an energy of 300 W/m² was applied to an irradiation surface (i.e., decorative layer side) of test sample 5, while keeping the temperature of a test room at 25° C. Herein, the irradiation surface of test sample 5 had an area of 200 mm×200 mm. The temperature of test sample 5 was measured by means of thermocouple 7 at a time when the sample temperature was stabilized, i.e., 60 minutes after starting the light irradiation.

As shown in TABLE, the interior trim components of EXAMPLES 1 to 8 had lower temperatures than those of COMPARATIVE EXAMPLES 1 and 2 after subjected to the heat shield test. It is thus evident that the skin material of the present invention effectively prevents a temperature rise in the interior trim component.

(2) Measurement of Far-infrared Emissivity

The far-infrared emissivity of each skin material was measured according to ASTM C1371-98 using a far-infrared radiometer: D&S AERD available from Kyoto Electronics Manufacturing Co., Ltd., in order to determine the degree of heat radiation preventing effect. The measurement was conducted on the skin material from the side of decorative layer 1, before the skin material was processed into the interior trim component.

The far-infrared emissivities of the skin materials of EXAMPLES 1 to 8 were lower than those of COMPARATIVE EXAMPLES 1 and 2, as shown in TABLE. It is thus apparent that the skin material of the present invention prevents radiant heat from being emitted from the interior trim component more effectively.

(3) Appearance Test

The appearance of each skin material was visually checked from the side of decorative layer 1 in order to evaluate the decorativeness. The evaluations were made depending on the occurrence of see-through sections in decorative layer 1, and rated as follows.

A: There was no see-through section in decorative layer 1.

B: There were few see-through sections in decorative layer 1.

C: There were many see-through sections in decorative layer 1 so that the appearance of the skin material was deteriorated.

The materials of EXAMPLES 1 to 8 had appearances that compared favorably with those of COMPARATIVE EXAMPLES 1 and 2, as seen from TABLE. Therefore, it is apparent that the skin material of the present invention has good decorativeness and allows the interior trim component to provide a decorative effect for vehicle interior.

(4) Vehicle-mounted Test

Each of the interior trim components of EXAMPLE 1 and of COMPARATIVE EXAMPLE 1 was mounted to the ceiling of a vehicle. Then, the vehicle was placed in an environmental testing room under the following test conditions by means of infrared lamps, a blower and an air conditioner. After the vehicle was left in the above testing room for 60 minutes, the surface temperature and the radiation temperature of the component were measured using a thermocouple available from RS Components K.K. under the product number 219-4337 and a thermometer available from Brüel & Kjaer under the product number NM0036, respectively. Herein, the radiation temperature was measured at around a head position of a vehicle occupant.

<Test conditions>

Irradiation energy: 767 W/m²

Temperature: 35° C.

Humidity: 70% RH

Wind speed: 0.8 m/sec

As shown in TABLE 1, the interior trim component of EXAMPLE 1 had lower surface temperature and radiation temperature than that of COMPARATIVE EXAMPLE 1. It is thus evident that the skin material of the present invention provides a practical effect of preventing a temperature a temperature rise in the interior trim component and heat radiation from the interior trim component so as to provide a pleasant thermal environment for vehicle interior.

The entire contents of Japanese Patent Application No. 2001-329136 (filed on Oct. 26, 2001) are herein incorporated by reference.

Although the present invention has been described with reference to specific embodiments of the invention, the invention is not limited to the above-described embodiments. Various modification and variation of the embodiment described above will occur to those skilled in the art in light of the above teaching. The scope of the invention is defined with reference to the following claims.

TABLE

|  | Heat Shield Test | Far-infrared | | Vehicle-mounted Test | |
| --- | --- | --- | --- | --- | --- |
|  | Sample temperature (° C.) | Emissivity Measurement Emissivity | Appearance Test Rating | Surface temperature (° C.) | Radiation temperature (° C.) |
| Example 1 | 42.5 | 0.46 | A | 62.3 | 38.2 |
| Example 2 | 45.6 | 0.58 | A | — | — |
| Example 3 | 40.8 | 0.28 | B | — | — |
| Example 4 | 47.1 | 0.48 | B | — | — |
| Example 5 | 49.3 | 0.61 | A | — | — |
| Example 6 | 46.8 | 0.52 | A | — | — |
| Example 7 | 40.5 | 0.31 | A | — | — |
| Example 8 | 48.8 | 0.59 | A | — | — |
| Comparative Example 1 | 68.9 | 0.88 | A | 70.5 | 62.1 |
| Comparative Example 2 | 58.7 | 0.82 | A | — | — |

What is claimed is:

1. A low-emission skin material, comprising:
   a decorative layer made of a fibrous substance comprising 60% by weight or more of bright fiber based on a total weight of the fibrous substance;
   a reflective layer laminated to the decorative layer and capable of reflecting visible radiation, near-infrared radiation, mid-infrared radiation and far-infrared radiation transmitted through the decorative layer; and
   a support layer laminated to the reflective layer to support the reflective layer,
   wherein the fibrous substance is colored with at least one of organic pigments and organic dyes.

2. The low-emission skin material according to claim 1, wherein the bright fiber is comprised in an amount of 75% by weight or more based on the total weight of the fibrous substance.

3. The low-emission skin material according to claim 1, wherein the fibrous substance is one of a woven fabric and a nonwoven fabric having a density ranging from 5 to 500 g/m$^2$.

4. The low-emission skin material according to claim 1, wherein the bright fiber is made of at least one polymeric compound selected from the group consisting of polyesters, polyolefins, polyacrylonitriles, polyamides and copolymers thereof.

5. The low-emission skin material according to claim 1, wherein the fibrous substance has a fiber size ranging from 0.1 to 15 denier.

6. The low-emission skin material according to claim 1, wherein the reflective layer is made of one selected from the group consisting of a metallic film, a metallic foil and metallic flakes, the support layer is made of one of a resin film and a nonwoven fabric, and the reflective layer is kept smooth by the support layer.

7. The low-emission skin material according to claim 6, wherein the reflective layer is made of a metallic film, the support layer is made of a resin film, and the metallic film is formed by vapor deposition of one of aluminum and aluminum alloy onto the resin film.

8. The low-emission skin material according to claim 1, wherein the reflective layer has a far-infrared emissivity of 0.5 or less.

9. An interior trim component, comprising the low-emission skin material as set forth in claim 1.

10. The interior trim component according claim 9, further comprising a substrate laminated to the support layer of the skin material.

11. The interior trim component according to claim 10, wherein the substrate is made of one selected from the group consisting of woven fabrics, nonwoven fabrics, resin films, corrugated cardboards and resin felts.

12. A method of producing the low-emission skin material as set forth in claim 1, the method comprising:
   preparing the decorative layer using the fibrous substance;
   coloring the fibrous substance with at least one of organic pigments and organic dyes;
   providing the support layer;
   forming the reflective layer on the support layer; and
   laminating the decorative layer to the reflective layer.

13. The method according to claim 12, wherein said preparing includes spinning at least one polymeric compound selected from the group consisting of polyesters, polyolefins, polyacrylonitriles, polyamides and copolymers thereof into the bright fiber.

14. The method according to claim 12, wherein said preparing includes forming the bright fiber into one of a woven fabric and a nonwoven fabric having a density ranging from 5 to 500 g/m$^2$ with the use of the bright fiber.

15. The method according to claim 12, wherein said forming is carried out by one of vapor deposition and sputtering of metal onto the support layer.

16. The method according to claim 12, wherein said forming is carried out by bonding a metallic foil to the support layer with an adhesive.

17. The method according to claim 12, wherein said forming is carried out by preparing a dispersion of metallic flakes, a resin and a hardener and applying the dispersion to the support layer.

18. The method according to claim 12, wherein said laminating is carried out by flame lamination.

19. The low-emission skin material according to claim 4, wherein the bright fiber is made of at least one polymeric compound selected from the group consisting of polyolefins and polyacrylonitriles.

* * * * *